April 1, 1941.  M. IRELAND  2,237,147
TIMER CONTROL FOR WAFFLE BAKER SIGNALS
Filed April 5, 1940  3 Sheets-Sheet 1
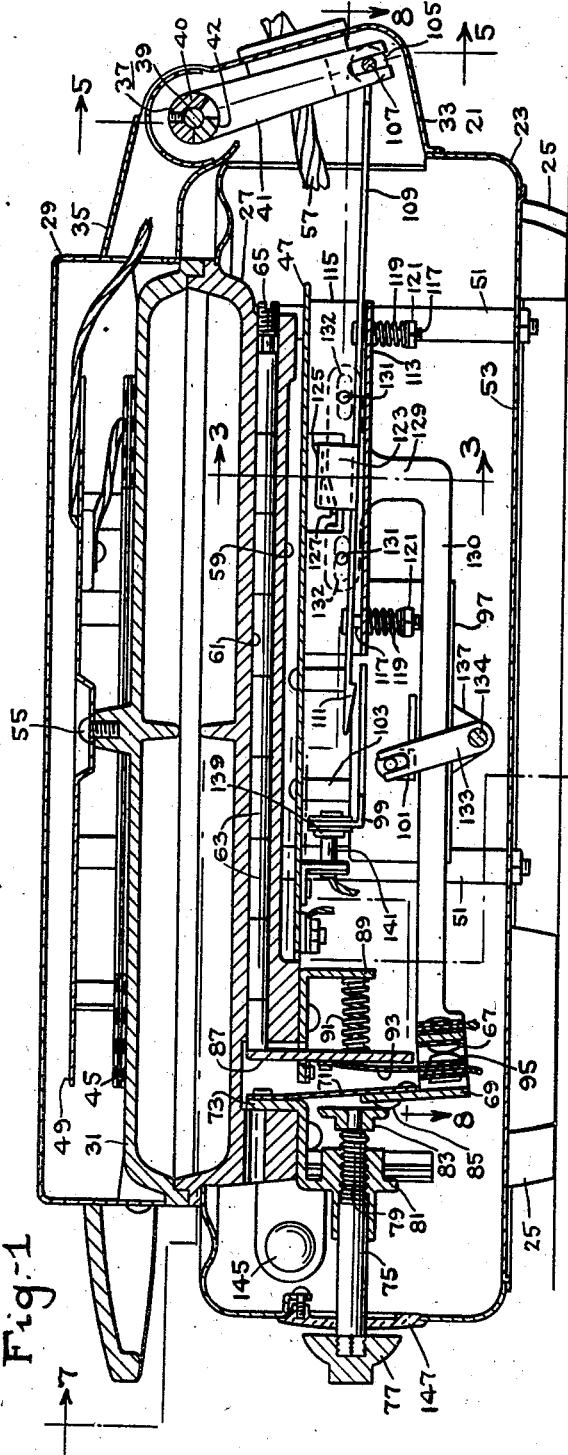
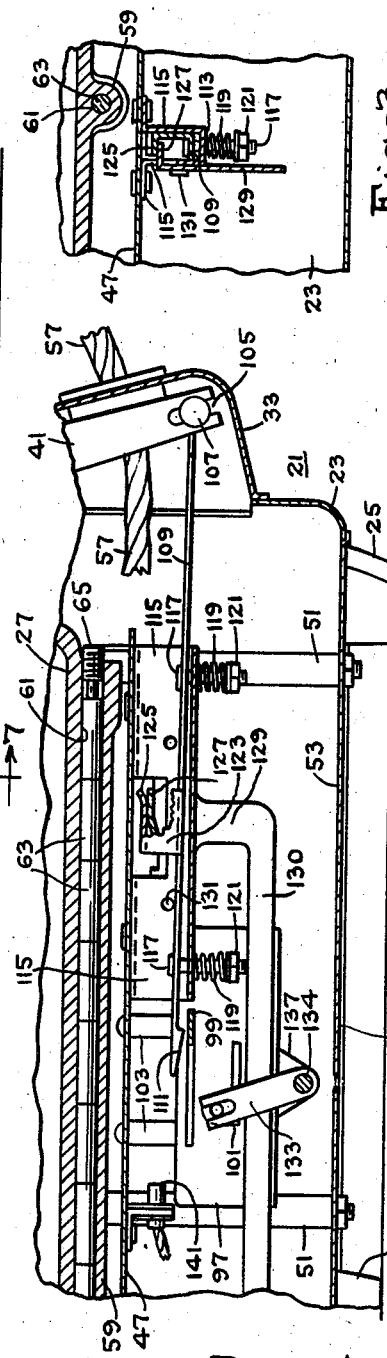
Inventor
Murray Ireland
By H. M. Bjebel
Attorney

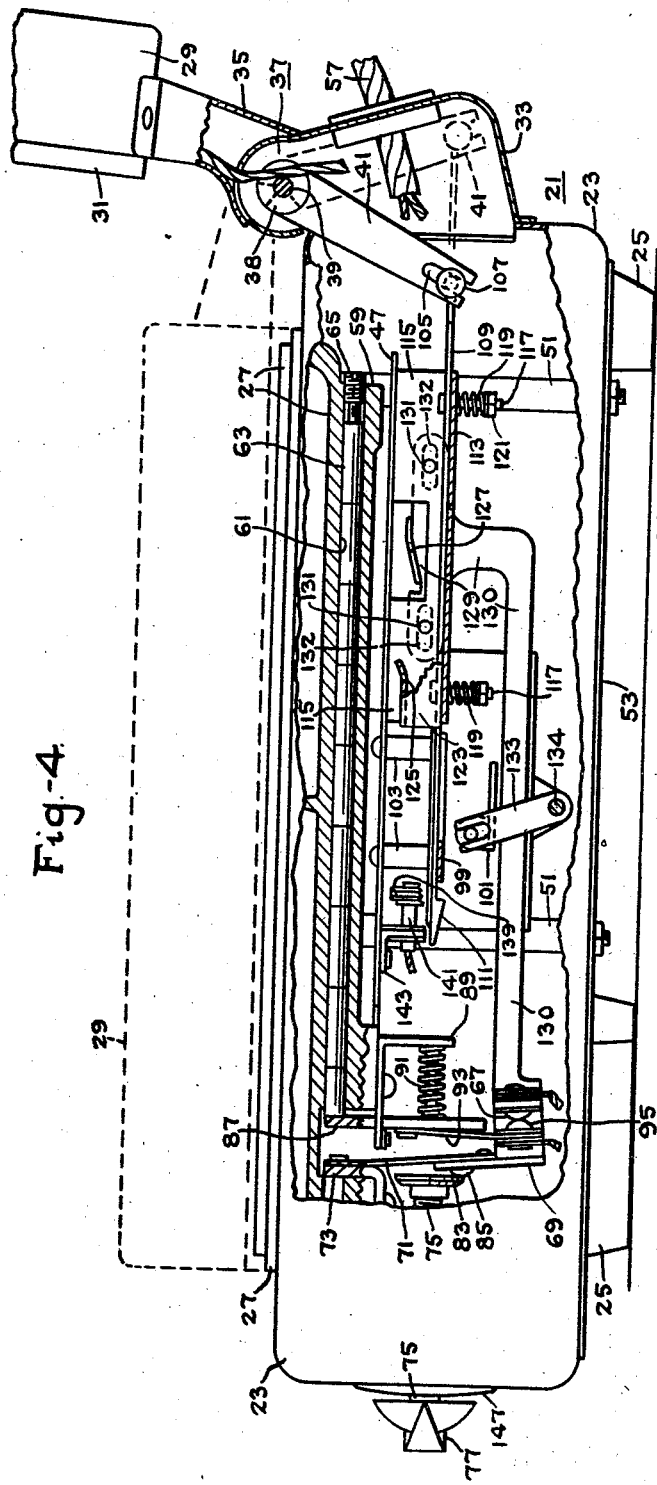

April 1, 1941.   M. IRELAND   2,237,147
TIMER CONTROL FOR WAFFLE BAKER SIGNALS
Filed April 5, 1940   3 Sheets-Sheet 3
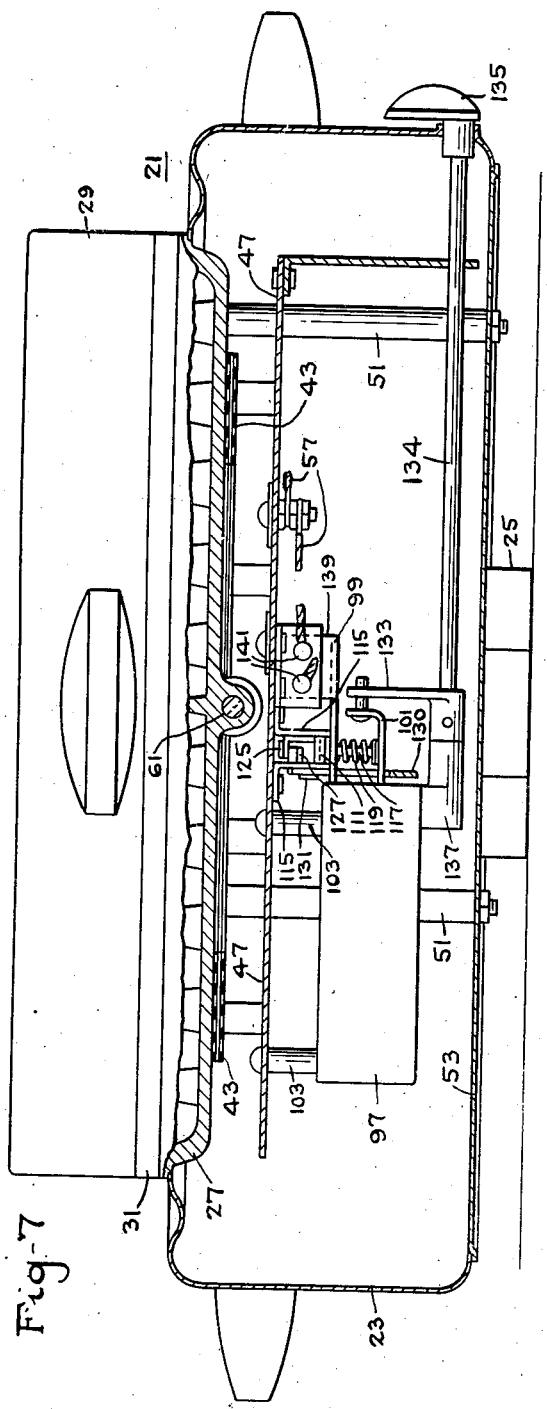
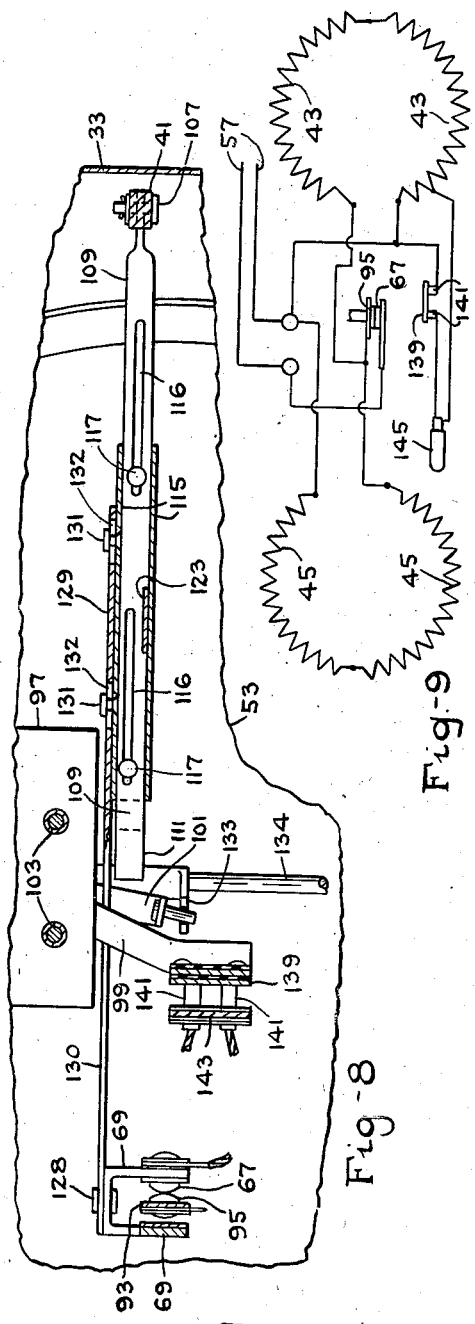
Inventor:
Murray Ireland
By H. M. Biebel
Attorney Patented Apr. 1, 1941

2,237,147

UNITED STATES PATENT OFFICE 2,237,147

TIMER CONTROL FOR WAFFLE BAKER SIGNALS

Murray Ireland, near Elgin, Ill., assignor to McGraw Electric Company, Elgin, Ill., a corporation of Delaware Application April 5, 1940, Serial No. 327,982

7 Claims. (Cl. 161—16)

My invention relates to electric cooking devices and particularly to means for signaling the completion of a cooking operation.

An object of my invention is to provide a relatively simple signal and timer control means therefor which signal timer shall be energized to start its operation simultaneously with the start of a cooking operation.

Another object of my invention is to provide a relatively simple and novel form of control for a visual signal that shall be independent of the temperature control of the cooking device.

Another object of my invention is to provide a control means for a signal that shall be connected with the temperature control means of the cooking device in such manner that adjustment of the temperature control of the device shall vary the operating time of the signal control.

Other objects will either be apparent from a description of one form of device embodying my invention or will be pointed out in the course of such description and set forth in the appended claims.

In the drawings:

Figure 1 is a central vertical sectional view through an electrically heated thermally controlled waffle baker embodying my invention, the parts thereof being shown in normal or non-operating position.

Fig. 2 is a fragmentary view showing a portion of what is shown in Fig. 1, the control parts being shown as energized and started in operation, Fig. 3 is a detail sectional view taken on the line 3—3 of Fig. 1, Fig. 4 is a side elevational view of a waffle baker embodying my invention with a portion thereof broken away to show the timer-winding arm in a given position, Fig. 5 is a detail sectional view taken on the line 5—5 of Fig. 1, Fig. 6 is a detailed perspective view of certain parts of my device, Fig. 7 is a sectional vertical view taken at right angles to that shown in Fig. 1 and on the line 7—7 of Fig. 1, Fig. 8 is a plan sectional view taken on the line 8—8 of Fig. 1, and, Fig. 9 is a wiring diagram used in my improved waffle baker.

I have elected to show the device embodying my invention as associated with and mounted in a waffle baker 21, which waffle baker comprises a lower casing 23 having a plurality of heat-insulating supports or legs 25 therebelow. The casing 23 supports a waffle baker grid 27 which may be of the usual kind used in waffle bakers and which may be secured to and supported by the casing 23 in any suitable or desired manner not shown in detail in the drawings.

An upper casing 29 is provided and has mounted therein an upper grid 31 which grid may be held in the open bottom upper casing 29 in any suitable or desired manner now well known in the art.

A lower hinge casing 33 is suitably mounted against and secured to the lower casing 23 and it cooperates with an upper hinge casing 35 to surround a hinge structure 37 which may be of any suitable or desired kind but includes particularly a hinge shaft 39 which is secured to the upper hinge casing 29 which supports the upper grid 31. The shaft 39 has secured thereto a hub member 38 having a tooth 40 projecting therefrom which engages a similar projecting tooth member 42 on the hub of a short arm 41 that is freely mounted on said shaft 39. These projecting members 38 and 42 form a jaw clutch to interlock the members 38 and 41. This construction provides left and right-hand turning movement for said shaft 39 and the short arm 41 during the opening and closing movements of casing 35 as best seen in full and broken lines of Fig. 4 for a purpose which will hereinafter appear.

The lower grid 27 has secured against its bottom surface an electric heating element 43, the design and construction of which constitutes no part of my invention and is therefore shown mainly for the purpose of illustrating an electrically heated waffle baker grid. The upper grid 31 has associated therewith an electric heating element 45 it being understood that the upper and the lower electric heating elements may be of the same or of like design and construction. Clamping means for holding the two heating elements against their respective grid surfaces may include a lower thin sheet metal plate 47 and an upper thin sheet metal plate 49. The plate 47 may be held in heating element clamping position by studs 51 which studs may also serve as a means for holding a lower closure plate 53 in proper operative position relatively to the lower casing 23. The upper heating element clamping plate 49 may be held in its proper operative position as by a single central screw 55 engaging a projecting lug on the upper surface of grid 31. Reference to Fig. 9 of the drawings will illustrate the diagram of connections of the electrical elements in the waffle baker and it is therefore to be understood that conductors will extend between the upper and the lower heating elements and a twin conductor cord 57 is provided to permit of connecting the heating elements to a suitable source of supply of electric energy in a manner well known in the art.

The lower grid 27 is provided with a diametrally extending projection or boss 59 integral with the grid itself, this boss having an aperture 61 drilled therein to receive a plurality of short non-expansible refractory elements or rods 63, which are held in proper operative position by an adjustable set screw 65 interfitting with one end of the apertured boss 59. As substantially all of the waffle baker grids now used are made of aluminum, it is obvious that they will expand radially or diametrally thereof on being heated and since the short members 63 are substantially non-expansible or contractible under temperature changes, the other end of the set of non-expansible elements 63 will move relatively to the grid and more particularly relatively to the other end of the boss 59, it being noted, as shown in Fig. 4 of the drawings, that the last element 63 extends beyond or outwardly of the end of the boss 59.

A manually adjustable contact member 67 is insulatedly mounted on a support 69 which support is of substantially U-shape and is carried by a spring bar 71 which may be fixedly mounted on a bracket 73 carried by the lower grid 27. Means for manually moving the contact member 67 comprises a shaft 75 having a knob 77 mounted thereon outside of the lower casing 23 the shaft 75 having a screw-threaded portion 79 positioned in a cooperatively screw-threaded bearing 81 which may be a part of bracket 73. The inner end of shaft 75 has mounted thereon a flat-surface disc 83 (see Fig. 1) the flat surface of which is adapted to engage against a small lug 85 on a part of support 69 so that turning movement of knob 77 will cause longitudinal shifting of disc 83 and corresponding movement of contact member 67 which, it is to be understood, is insulatedly supported on member 69.

The exposed end of the non-expansible element, including particularly the plurality of short rods 63, engages against a lever arm 87 which has a knife-edge support in a bracket 89, a biasing spring 91 tending to turn the bar 87 in a clockwise direction to cause the upper end thereof, as seen in Fig. 1 of the drawings, to be pressed against the exposed end of the last element 63. A resilient contact bar 93 is mounted on and extends beyond the lower end of member 87 and has a contact member 95 insulatedly mounted thereon and located in such position as to engage with and be disengaged from the adjustably supported contact member 67 to thereby control the energization of the heating elements of the waffle baker grids.

It is to be understood that the design and construction of the hereinbefore described thermally controllable switch for the grid heaters is such that the contacts 67 and 95 will be in engagement with each other at lower temperatures and that the cooperating action of the non-expansible rods and of the expansible grid will cause disengagement of the contact members and deenergization of the electric heating elements when the grids have been heated to a predetermined adjustable temperature determined by the operator with the help of the knob 77.

A mechanical timer 97, shown generally only in Fig. 7 of the drawings, may be of any suitable or desired type including a spring member, means for winding up said spring and a retarding gear train, as well as a means for carying the duration of the run-down period of the timer and reference may be had to Patent No. 2,147,376 issued February 15, 1939, to L. V. Lucia and assigned to the same assignee as is my present application for further details of a timer of the kind which I now prefer to use for a purpose to be hereinafter described in greater detail. A timer of this kind is of the constant speed stype and is provided with a wind-up arm 99 and also with a second arm 101 which arm 101 may be adjusted manually in order to vary the running-down time of the constant mechanical timer. The timer 97 may be supported from plate 47 as by a plurality of studs 103 or in any other suitable or desired manner.

Lever arm 41 has a slot 105 in its outer end into which there fits a pin 107 connected to one end of a timer-winding link 109, the other end of member 109 having a hook 111 thereon at the other end, which hook is adapted to engage with the timer-winding arm 99 in a manner as will now be described. Member 109 is supported for longitudinal movement in a support 113 which may be of substantially channel-shape in lateral section and which may be supported from the plate 47 as by bracket portions 115 secured against plate 47 in any suitable or desired manner. The arm 109 is provided with extended slots 116 therein through which short headed studs 117 may project, these studs having a compression spring 119 thereon held by nuts 121 on the lower ends of the respective pins 117 to thereby yieldingly hold link 109 against the bottom surface of its support 113.

It is, of course, necessary that the hook end of member 109 be disengaged from the timer-winding arm 99 at the end of the desired amount of winding of the timer and for this purpose link 109 is provided with an upwardly extending flange 123 having thereon a lateral portion 125, the under surface of which is adapted to engage the top surface of an adjustable cam 127 to cause lifting movement of particularly the hook end 111 of link 109. Cam surface 127, as shown in Fig. 4, is integral with and extends laterally from a plate 129 which is part of a link arm 130 that is connected to member 69 by a headed bolt or rivet 128 as shown in Figs. 6 and 8, so that cam 127 is caused to move longitudinally when the operator turns adjusting knob 77 to vary the average temperature of both grids of the waffle baker. Plate 129 is slidably supported at one side of member 115 as by pins 131 fixed in one side of member 115 and extending through elongated slots 132 in plate 129. The design and construction of these parts is such that when the operator turns knob 77 to increase the operating temperature of the grids, plate 129 and cam surface 127 are moved longitudinally toward the left as seen in Fig. 4 of the drawings so that disengagement of the hook end of member 109 will be effected earlier and the timer will therefore be wound up to a lesser degree than will be the case if the operator adjusts knob 77 to cause the thermal control to provide a lower average operating temperature in the grids during operation of the waffle baker.

It is to be understood that I may omit this part of the control mechanism, that is the interconnection of the grid temperature control means and the timer wind-up means, if so desired. In this case the timer will be wound up to the same degree at each operation thereof.

I provide further means associated with adjusting arm 101 whereby an operator may vary the running-down of the mechanical timer 97, this means including a lever arm 133 mounted on and adapted to be turned by a rod 134 having mounted thereon an adjusting knob 135 fixed on the shaft outside of the casing 23. The inner end of rod 134 may be supported as by a bearing member 137 secured to the timer structure or support in any other suitable or desired manner for its intended purpose. As will be noted by reference to the above mentioned Lucia patent, turning movement of arm 101 effected by turning movement of knob 135 in the present instance, will cause the timer-winding arm 99 to be disengaged from the gear train of the timer at a time manually adjustable at the will of an operator, the timer-winding arm 99 then moving quickly to its final position substantially as shown in Fig. 8 of the drawings. A contact bridging member 139 is insulatedly supported by the arm 99 at its outer end and this contact bridging member is adapted to engage a pair of contact members 141 which are insulatedly supported as by a bracket 143 supported by the lower grid assembly in any suitable or desired manner.

Reference to Fig. 9 of the drawings will indicate that when contact members 141 are engaged by contact bridging member 139, the circuit through a visual signal 145 such as a small incandescent lamp, will be closed and, as shown in Fig. 9 of the drawings, I may energize said visual signal as by connecting it to a small part of say the lower heating resistor 43 associated with the lower grid 27.

I am aware of the fact that signal means for indicating the termination of a waffle baking operation have been provided in waffle bakers made and sold in the United States but in each of these devices the mechanical timer controlling the energization of the signal to indicate the termination of a baking operation has been manually started as by the operator moving a lever arm which extended outside of say the lower casing. This had the substantially fatal drawback that the timer was not necessarily started and energized simultaneously with the initiation of a waffle baking operation but that an operator could start the operation of the signal controlling means at any desired time which, of course, really defeats the object and efficiency of such a signal.

In contradistinction to this, the device hereinbefore described is operated by and in fixed combination with one of the grids of a plural grid waffle baker and particularly by the upper grid and casing which is angularly movable relatively to the lower grid and casing. As shown, for instance, in full lines in Fig. 4 of the drawings, the upper grid is in its open position where it is out of engagement with the lower grid, to permit of batter being poured on the heated lower grid. It is to be understood, of course, that the main heating elements are to be initially energized for a sufficient length of time to cause proper temperature rise of the grids and it may be here pointed out that the visual signal 145 will indicate by being lighted and giving out its light through a translucent covering 145 over a suitable opening in the lower casing, that the heaters are energized and it will be further evident that when the contact member 95 is moved out of engagement with the substantially fixed contact member 67 upon the lower grid reaching the desired operating temperature, the signal 145 will also be de-energized since current is cut off from the grid heating elements. The operator will thus be advised by discontinuance of the illumination of the translucent covering for the signal 145 that the grids have been heated up sufficiently to permit of starting the first waffle baking operation by moving the upper grid to the position shown in full lines in Fig. 4 of the drawings, pouring on the batter and then moving the upper grid and casing to their proper operative position on the lower grid, substantially as shown for instance in Fig. 7 of the drawings. When the upper grid is moved down into engagement with the lower grid, the link 109 is caused to move longitudinally of its length to the position shown in Fig. 1 of the drawings, the hook end thereof engaging timer-winding arm 99 and causing turning and winding movement thereof to the desired degree as permitted by the interengagement of deflecting member 125 and the cam surface 127. Since flange 125 rides on the upwardly inclined cam surface 127, the hook end of link 109 will be disengaged from the timer-winding arm 99 and the timer will then start to run down. At the time that the upper grid is angularly moved downwardly as hereinbefore described, bridging member 139 will be moved out of engagement with contact members 141 and the visual signal 145 will therefore not be energized during the baking operation.

When the timer-winding arm has been moved back into its normal position, as shown in Fig. 8 of the drawings, the engagement of bridging member 139 with contacts 141 will cause the signal 145 to be reenergized and indicate to an operator that the baking operation has been completed.

As was hereinbefore set forth, adjustment of the operating temperature of the grids will vary the amount of winding up of the timer and I prefer to so arrange this interconnection that a shorter operating time will be automatically provided when the operating temperature has been adjusted for a higher value than will be the case when the operating temperature adjustment is for a lower value. As noted above, however, this feature may be omitted, if desired.

I wish to point out that my invention makes it possible for a user of a waffle baker having my signal control associated therewith to bake a waffle at a low temperature for a relatively long time or for a relatively short time and also to bake a waffle at a high temperature for either a short time or for a longer time. This means that the duration of a baking operation can be made independent of the grid temperature.

It is further obvious that it is possible for an operator to vary the running-down time of the winder by manually adjusting knob 125 to thereby vary the length of time the winding arm will move slowly as determined by the retarding mechanism usually comprising a train of gears and an escapement, all as disclosed and claimed in the above-mentioned Lucia patent.

It is therefore obvious that the timer constituting a part of my invention is energized and started in operation simultaneously with the reengagement of the two grids after batter has been poured thereon during the time that the upper grid was in its upper position disengaged from the lower grid and therefore is started simultaneously with the starting of a waffle baking operation.

While I have illustrated and described a single embodiment of my invention, it is obvious that changes and modifications may be made therein and I therefore desire that all such modifications as clearly come within the scope of the appended claims shall be considered to be covered thereby.

I claim as my invention:

1. In a waffle baker including a lower grid, an upper grid movable away from and into engagement with the lower grid and electric heating means for each of said grids, the improvement comprising a visual signal for indicating the termination of a baking operation, a mechanical timer for controlling said signal, a timer-winding arm on said timer, a link connected to the upper grid and movable thereby into engagement with the timer-winding arm when the upper grid is moved away from the lower grid and is moved to cause wind-up of the mechanical timer when the upper grid is moved into engagement with the lower grid and means engaging said link near the end of its timer-winding movement to disengage it from said timer-winding arm and means on said time-winding arm for causing energization of the signal when the timer has completed its operation.

2. In a waffle baker including a lower grid, an upper grid, hinge means connecting said grids for relative angular movement out of and into engagement with each other and electric heating means for said grids, the improvement comprising a visual signal for indicating the termination of a baking operation, a mechanical timer, a timer-winding arm on said timer, a lever arm fixedly operatively secured to and movable with the upper grid, a link having one end connected to said lever arm and having its other end of substantially hook-shape and adapted on angular movement of the upper grid away from the lower grid to cause the hook-shaped end to engage the timer-winding arm and to cause the link to move the timer-winding arm to wind up the timer when the upper grid is moved toward and into engagement with the lower grid, means to cause release of the hook end of the link from the timer-winding arm prior to engagement of the upper and the lower grid and means on said timer-winding arm for causing energization of the signal when the timer has fully run down.

3. A device as set forth in claim 1 and including manually-adjustable grid-temperature control means and means connecting the grid-temperature control means and the link-disengaging means to cause the link to be disengaged from the timer-winding arm at a point depending on the adjustment of the grid-temperature control means.

4. A device as set forth in claim 1 and including manually-adjustable grid-temperature control means and means connecting the grid-temperature control means and the link-disengaging means to cause the link to be disengaged from the timer-winding arm with lesser degree of winding of the timer as the grid-temperature control means is adjusted for a higher temperature setting.

5. A device as set forth in claim 2 and including means comprising manually-adjustable grid-temperature control means for varying the degree of wind-up of the timer in accordance with the setting of the grid-temperature control means.

6. A device as set forth in claim 2 and including means comprising manually-adjustable grid-temperature control means for varying the degree of wind-up of the timer in accordance with the setting of the grid-temperature control means and manually-adjustable means for varying the running-down time of the timer.

7. A device as set forth in claim 2 and including manually-adjustable means for simultaneously varying the operating temperature of the grids and the wind-up of the timer and for varying the running-down time of the timer.

MURRAY IRELAND.